May 7, 1940.    A. F. GODFREY ET AL    2,199,990
SIGNAL FLARE
Filed Aug. 2, 1938    3 Sheets-Sheet 1
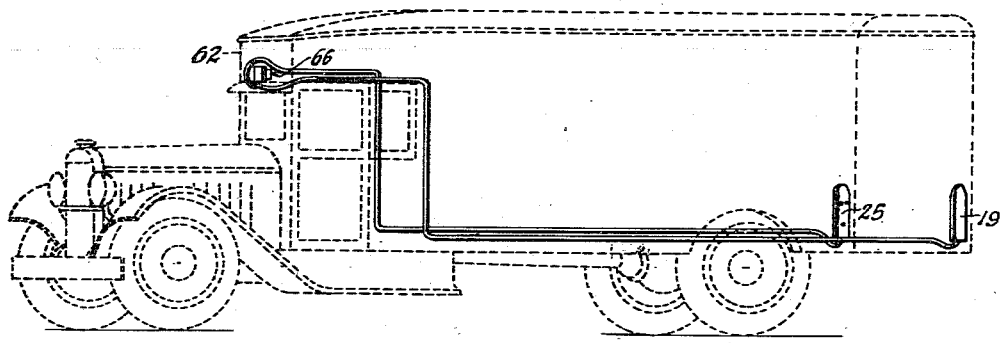
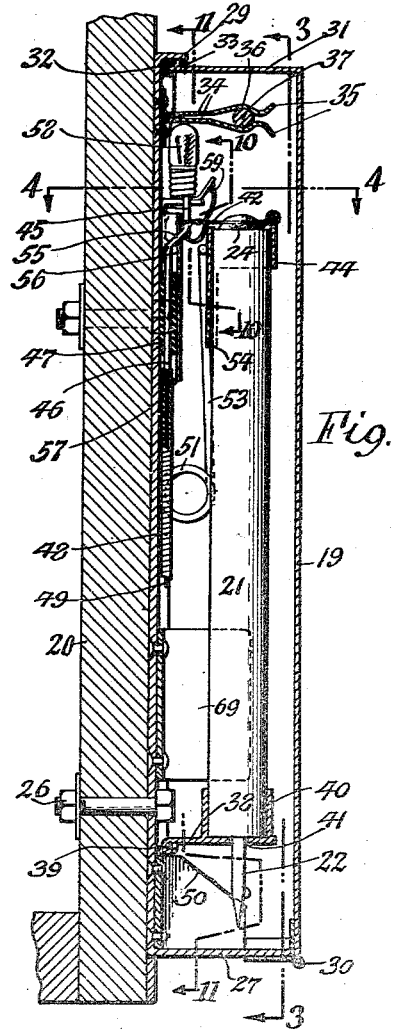
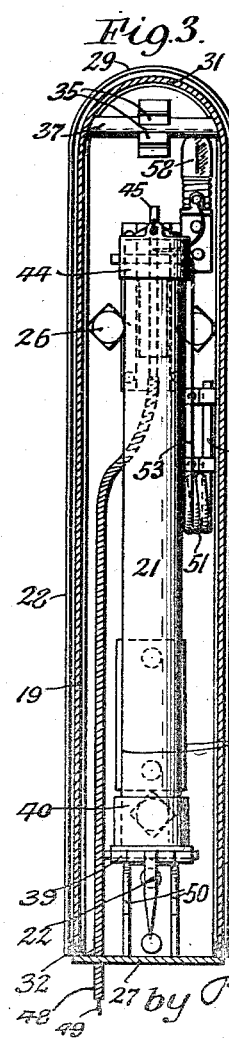
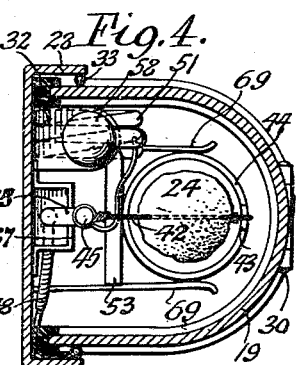
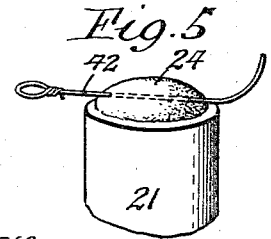
Albert F. Godfrey
Reginald Westwood
Inventors
by Popp & Popp
Attorneys

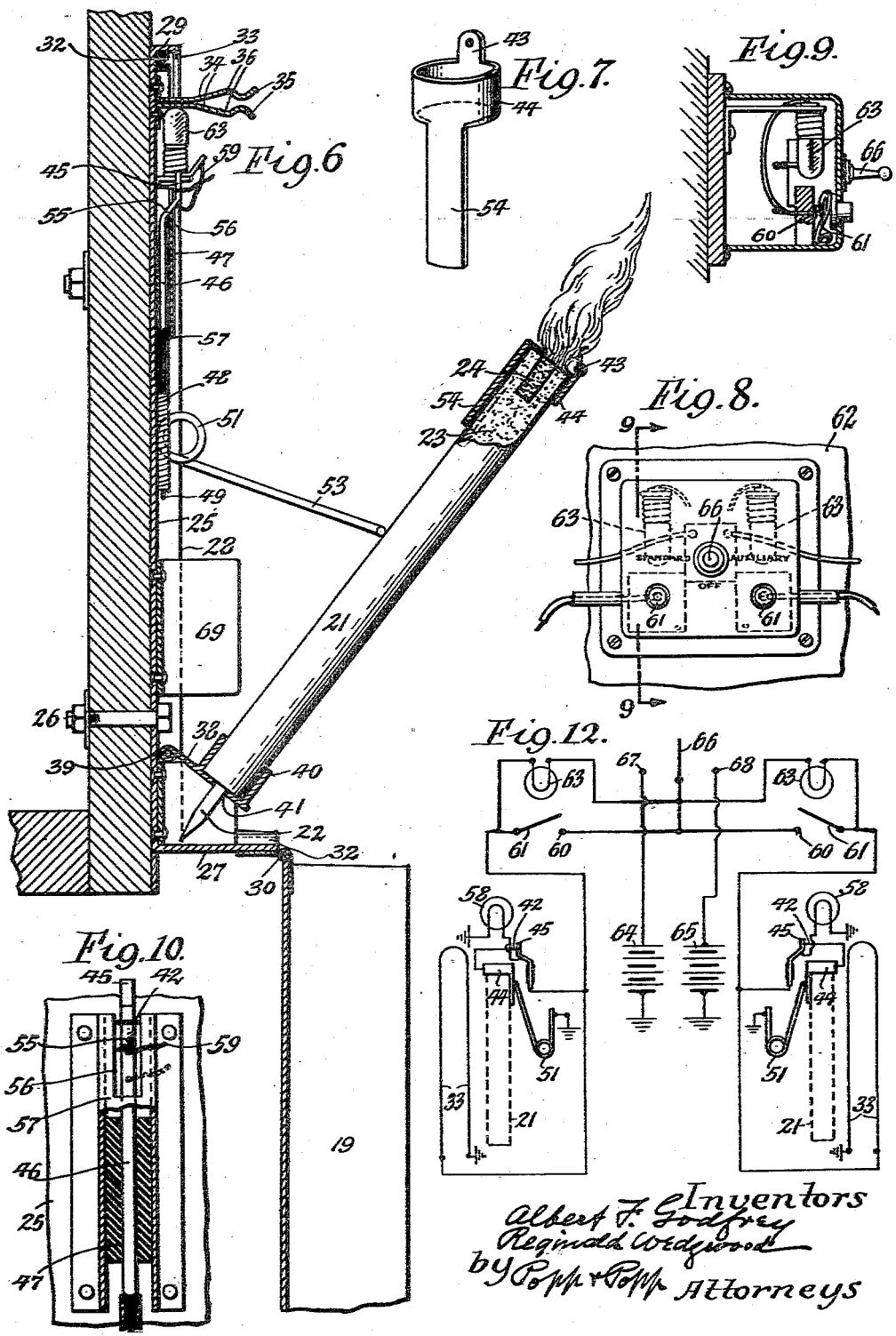

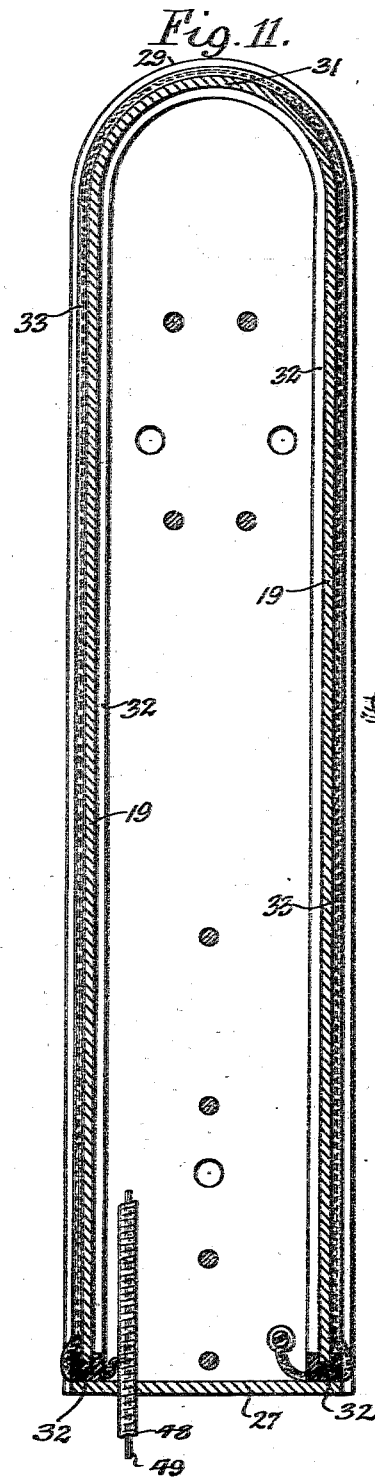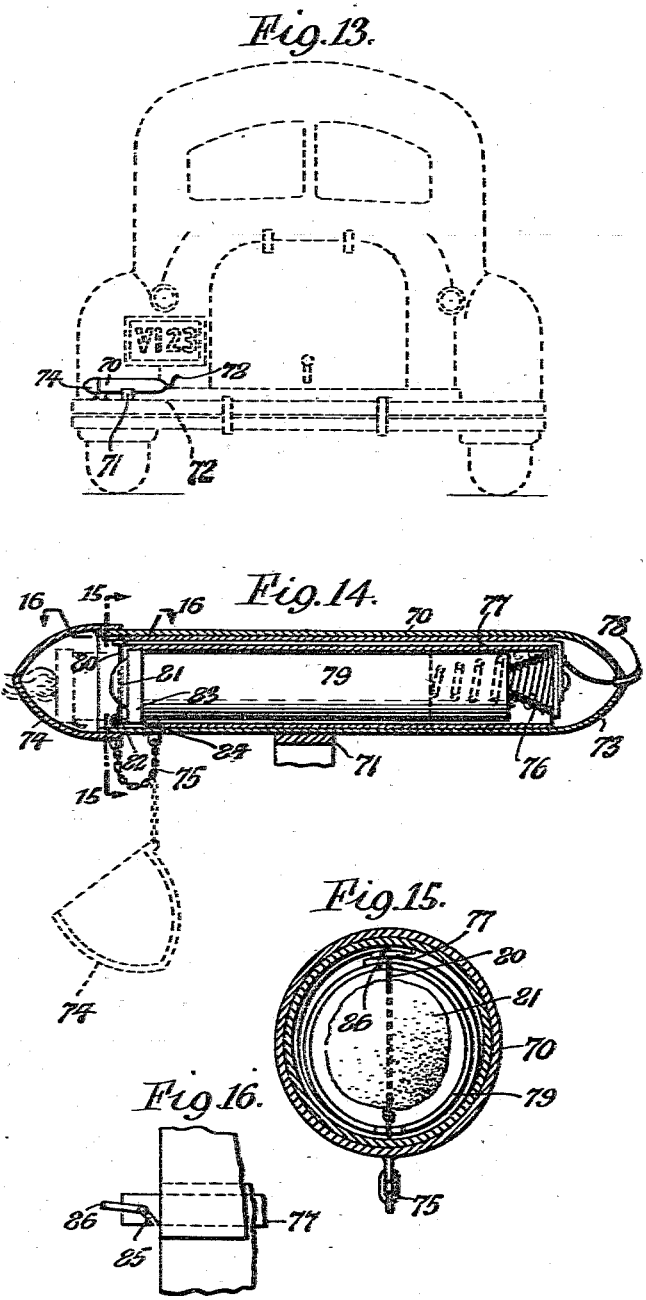

Patented May 7, 1940

2,199,990

UNITED STATES PATENT OFFICE 2,199,990

SIGNAL FLARE

Albert F. Godfrey and Reginald Wedgwood, Buffalo, N. Y., assignors of thirty per cent to Adam E. Shaw and 30 per cent to George M. Wilkins, both of Buffalo, N. Y.

Application August 2, 1938, Serial No. 222,668

8 Claims. (Cl. 177—324)

This invention relates to a signal flare which is more particularly intended for use in connection with merchandise transporting trucks or similar vehicles so that when a truck is halted on the road the operators of other vehicles may be warned in order to avoid accidents which otherwise might possibly occur.

Heretofore the use of flares of this character required too much time for putting the same in operation after a truck came to a stop and this has frequently resulted in serious damage to property and injury to persons.

One of the objects of this invention is to provide a flare which can be permanently mounted on the rear or other available part of a truck and instantly lighted by the operator of the truck while he is occupying the front part of the same and thereby eliminate the loss of time which has occurred in the use of flares as heretofore constructed.

Another object of this invention is to so organize the means for mounting the torch or fusee of the flare that the same will be effectively protected against damage or injury when the same is not in use, but will be quickly uncovered, projected from the truck into an operative position and also lighted so as to give a warning signal by means which are manually controlled at a point remote from the torch and preferably located on the front part of the car and easily and conveniently accessible to the driver of the truck.

A further object of this invention is to provide means for mounting the torch or fusee on the truck so that the same after being used can be readily replaced by a new and unused torch.

Other objects of this invention relate to certain novel features of construction as will presently appear.

In the accompanying drawings:

Fig. 1 is a perspective view showing this invention in connection with a motor truck and organized for giving flare signals on both the right and left hand sides of the rear part of the truck.

Fig. 2 is a vertical longitudinal section of one form of signal flare embodying this invention, the parts being in the position which they occupy when the torch is in its inoperative position and enclosed by a protecting casing.

Fig. 3 is a vertical transverse section of the same taken on line 3—3, Fig. 2.

Fig. 4 is a horizontal section, on an enlarged scale, taken on line 4—4, Fig. 2.

Fig. 5 is a fragmentary perspective view of the signal torch showing one form of primer and igniting fuse suitable for use in connection with this invention.

Fig. 6 is a view similar to Fig. 2 but showing the protecting casing for the torch opened and the latter lighted and moved into its operative position for giving a warning signal.

Fig. 7 is a detached perspective view of an electric terminal collar applied to the upper end of the torch and serving as means for attaching the lighting fuse to the torch and also as means for controlling the electric circuit for heating the fuse preparatory to igniting the primer of the torch and releasing the means which operate to open the protecting casing and projecting the torch into its operative position.

Fig. 8 is an elevation of a switch mechanism whereby the lighting means of the signal flare may be placed in circuit with either a standard wet battery or with a dry emergency battery and either the right hand torch or the left hand torch, or both of these torches may be lighted as occasion requires.

Fig. 9 is a vertical section taken on line 9—9, Fig. 8.

Fig. 10 is a fragmentary vertical section, on an enlarged scale, taken on line 10—10, Fig. 2.

Fig. 11 is a vertical section, on an enlarged scale, taken on line 11—11, Fig. 2.

Fig. 12 is a diagrammatic view showing the electric wiring or connection between the several members of the signalling device when employing flares on opposite sides of a car and controlling the same from a single place remote from the flares.

Fig. 13 is a front elevation of a modified form of the signal flare embodying this invention and applied to the front of an automobile.

Fig. 14 is a vertical longitudinal section of the signal flare shown in Fig. 13.

Fig. 15 is a vertical transverse section, on an enlarged scale, taken on line 15—15, Fig. 14.

Fig. 16 is a fragmentary horizontal section, on an enlarged scale, taken on line 16—16, Fig. 14.

In the following description similar characters of reference indicate like parts in the several figures of the drawings.

Referring to the construction of the signal flare which is shown in Figs. 1 to 11, the numeral 20 represents a support upon which the signal flare is mounted, this support in the present instance consisting of the rear part of an automobile truck body although it is to be understood that this support may form part of any other kind of vehicle, means of transportation, or other object the presence of which is to be indicated by a combustible flare so that collision therewith will be avoided and property and lives safeguarded.

When this invention is used for protecting the rear end of an automobile, means embodying this invention may be employed on both the right and left hand sides of the car body and means also provided in the cab at the front of the vehicle for igniting the torches of either one or both of these flares, as shown in Figs. 1 and 12. The following description of one of these flares and the method of mounting and igniting the same applies to both of them.

The torches of these flares may be of the same general construction as those now in common use for giving signals on highways or other places which are to be protected and as now generally made each of these torches, also known as candles or fusees, comprises a tubular container 21 of paper or other suitable material having a spike 22 at its lower end whereby the same may be driven into the ground or elsewhere if no special support for the same is provided. The interior of this tubular body contains a combustible illuminant 23 which is readily ignited by a primer or cap 24 arranged on the upper end of the tubular body 21 and extending into the body of combustible illuminant. When the primer or cap is lit the same burns and in turn ignites the combustible illuminant whereupon the latter burns for a considerable time in the form of an illuminating flame which projects from the outer end of the tubular body and serves as a signal wherever the same is located.

This torch is mounted within an enclosing casing or housing which is attached to the side of the automobile body or other support, this casing being closed when the torch is not in use so as to protect the same against damage by weather or tampering and opened for permitting the torch to be projected therefrom while its combustible illuminant is burning and giving a signal. Although this casing may be variously constructed the same, as shown in Figs. 1, 2, 3, 4, 6 and 11 is preferably constructed as follows:

The numeral 25 represents the metal back plate of the relative stationary base or body of the housing which may be secured to the outer side of the support 20 in any suitable manner, for instance by means of bolts 26, as shown in Figs. 2, 3 and 6. At its lower end this base or back plate is provided with a horizontal bottom 27 which projects horizontally outward from this base plate and at its opposite vertical edges this base plate is provided with upright outwardly projecting flanges 28 which are connected at their upper ends by a curved flange 29 projecting outwardly from the upper part of the base plate. The lid or cover 19 of the enclosing casing is constructed generally in the form of an upright trough, the concave side of which faces toward the base 25. The front part of the lower end of the lid is pivotally connected by means of a hinge 30 to the front end of the bottom 27 while its upper end is closed by a rounded top 31, as best shown in Figs. 2, 3 and 11. When the lid of the casing is closed the same is swung upwardly and backwardly toward the base of the casing so that the edges of the opposite walls and top of the lid are close to the base 25 and arranged with side and top flanges 28, 29 of the latter. When the parts are in this position a weather tight joint is produced between the base and lid so as to exclude dust, rain and snow by means of a packing which is arranged in the joint between the space and lid. This packing may be attached to the base and engaged by the lid or the packing may be secured to the lid and engaged with the base, but in the form shown in the drawings this packing consists of a strip 32 of rubber or other resilient material which is U-shaped in cross section and secured by cement or otherwise to the base plate within the vertical and top flanges 28, 29 thereof, the channel of this packing strip facing forwardly and receiving the side and top edges of the lid when the latter is closed, as best shown in Figs. 2, 3 and 11.

To prevent the rear edges of the lid from becoming stuck in the packing 32 on the base by snow or ice thereon, the release of the lid may be effected by means of an electric heating element 33 having preferably the form of a wire arranged within an insulating covering and mounted on the inner side of the upright and top flanges 28, 29 of the base adjacent to the inner edges of the same, as shown in Figs. 1, 4, 6 and 11. Upon passing an electric current through this heating element the same will become heated and thereby thaw any ice or snow which may be located in the joint between the lid and the base of the casing and thus permit the lid to be readily opened. The lid of the casing may be held yieldingly in its closed position in any suitable manner but preferably by frictional means similar to those shown in the drawings. In their preferred form these lid holding or retaining means, as shown in Figs. 2 and 3, consist of two spring arms 34 which are secured at their rear ends to the upper part of the base plate 25 and have their front ends provided respectively with forwardly diverging lips 35 and their opposing inner sides provided with concave jaws 36 immediately in rear of these lips. The upper part of the lid is provided on its inner side with a horizontal retaining bar or pin 37 which upon swinging the lid into its closed position will first enter between the lips of the retaining arms and spread the same until this retaining pin is in line with the jaws 36 after which the latter will be closed due to the resilience of the arms 34 and thereby hold the lid frictionally in its closed position.

The torch is removably mounted within the enclosing casing so that when the same is not in use it is arranged in an upright position and enclosed by the casing, as shown in Figs. 2, 3 and 4 but the torch is permitted to project from the casing and assume an inclined position relative to the base thereof when the lid is open and the torch has been ignited for giving an illuminating flame signal. The means for thus supporting the torch on the casing comprise a vertically swinging supporting bracket or arm 38 which is pivoted at its rear end by means of a hinge 39 to the adjacent part of the base plate 25 so that this arm can swing vertically, said arm being provided at its front end with an upwardly opening socket 40 which is adapted to receive the lower end of the torch 21 and support the latter either in its upright inoperative position, shown in Fig. 2, or in its inclined operative position, shown in Fig. 6. In order to permit the torch to be thus inserted in the socket 40 notwithstanding that its lower end is provided with the spike 22, that part of the supporting arm 38 which forms the bottom of the socket 40 is provided with an opening 41 through which the spike 22 projects while the torch is engaged with the socket 40, as shown in Figs. 2 and 6. While the torch is arranged in an upright position within the enclosing casing the same is received above the socket 40 by a guide 69 on the base, as shown in Figs. 2, 3 and 4, thereby preventing the torch from being shaken out of place while the truck is traveling over rough roads. Various means may be provided for igniting the primer or cap of the torch, those shown in Figs. 2, 3, 4, 5, 6, 7 and 10 being satisfactory and constructed as follows:

The numeral 42 represents a fuse made of a wire filament which is readily heated and melted or weakened upon passing a current of electricity through the same. This wire has its intermediate part in contact with the cap or primer 24 either by engaging the outer side of the same or embedding this part in the primer, as shown in Figs. 2, 4 and 5. The front end of this fuse is connected with a metal eye 43 formed on the front end of a metal terminal collar 44 which is slipped over the upper end of the torch body 21, as shown in Figs. 2, 3 and 4. The rear end on this fuse is twisted into the form of a loop or eye which engages with the upper end of an upright pin shaped keeper 45, as shown in Figs. 2 and 4. This keeper is connected by a guide arm 55 with the upper end of a vertically movable support rod 46 which slides in a guideway 47 of insulating material on the adjacent part of the base plate 25. This supporting rod 46 together with the keeper 45 are yieldingly held in an elevated position by a resilient or spring-like tubular casing 48 which latter also forms an enclosure for the wire 49 which forms part of the circuit whereby the electrical current is conducted to one end of the fuse 42. While the fuse is intact the torch is held thereby in an upright operative position, as shown in Fig. 2, but the instant that the fuse is ruptured the torch is released and moved outwardly and strikes its upper end against the upper part of the lid whereby the retaining pin 37 of the latter will be withdrawn from the spring jaws 36 and cause the torch to be moved outwardly and the lid to be thrown downwardly into a position in which it uncovers the torch and hangs in a pendant position from the bottom 27 of the casing base, as shown in Fig. 6. The outward or forward movement of the torch upon reaching this inclined position is limited by means of stops 50 arranged on the lower front part of the casing base in position to be engaged by the rock arm 38 which carries the socket 40. This forward or outward movement of the torch following the rupture of the fuse is effected by spring ejecting means which preferably comprise a coil spring 51 having one end terminating in an anchor arm 52 which is secured to the central part of the casing base while its opposite end terminates in a pressure arm 53 which in the upright inoperative position of the torch bears against the rear side of the terminal collar 44, as shown in Fig. 2, but which in the forwardly inclined operative position of the torch bears against the inner side of the body 21 of the latter, as shown in Fig. 6.

The spring 51 and its arms 52 and 53 constitute part of an electric conductor which is included in a circuit containing the fuse 42, collar 44, and keeper 45, which circuit is closed when the torch is at an upright position and the spring arm 53 engages with the collar 44 and is under tension. The electric current at this time will cause the fuse to become heated or incandescent and thereby weakened, which weakening is promoted by the subsequent flame of the primer and the combustible illuminant following the ignition thereof by the fuse, whereby the pressure exerted by the spring arm 53 against the rear side of the terminal collar on the torch will cause the fuse to be ruptured. When this occurs the upper part of the torch is thrown outwardly by the spring arm 53 and strikes the inner side of the lid adjacent to the upper end thereof with sufficient force to disengage the retaining pin 37 of the latter from the jaws 36, whereby the lid of the enclosing casing is thrown outwardly and downwardly into its open inoperative position and the torch is moved into its outwardly inclined operative position, as shown in Fig. 6.

When the lighted torch is moved laterally out of the casing into its operative position the arm 53 of the ejecting spring is disengaged from the terminal collar 44, as shown in Fig. 6, thereby breaking the electric circuit between this spring and the terminal collar after which the current is directed through the higher resistance branch circuit containing the service lamp 58 and causes the latter to be illuminated for convenience in replacing the burnt torch with a new or unused torch. When, however, the new torch has been substituted for the used torch and a new fuse is engaged with the primer or cap on the new torch and the latter is again turned inwardly into its operative position, the arm 53 of the ejecting spring again engages with the terminal collar 54 so as to reestablish the circuit through the fuse and the heating wire while the branch circuit of the service lamp 58 is cut out and this lamp for the time being is extinguished.

While the torch is thus arranged in an inclined position the combustible illuminant which has been ignited by the burning of its primer will cause an illuminating signal flame to issue from the upper part of the torch body until the same has been consumed after which the same may be replaced by a fresh torch for continuing the signaling effect if this becomes necessary. In order to insure a metallic contact between the arm 53 of the ejecting spring and the terminal collar and still permit of using torches having bodies which vary somewhat in length, the rear part of the terminal collar is provided with a downwardly projecting extension 54 which is of sufficient length to insure engagement of the ejecting arm 53 therewith and complete the electric circuit through the fuse when the torch is restored to its upright position within the casing and retained in place by a new fuse which connects the terminal collar 44 with the keeper 45. For convenience in connecting the loop or eye at the rear end of the fuse with the keeper 45, the latter is pulled downwardly against the resilience of the spring tube 48 a sufficient extent to bring the upper end of the keeper in line with the fuse and permit its rear eye to be engaged with the keeper after which the spring tube 48 is released so as to permit its resilience to again elevate the keeper 45 and hold the same reliably in engagement with the rear eye of the fuse, as shown in Fig. 2. In order to prevent this keeper from turning so that it will not get out of place and still permit the same to move vertically, the arm 55 connecting the supporting rod 46 and the keeper 45 is passed through a vertical slot 56 on a retaining plate 57 which is carried by the base of the casing, as shown in Figs. 2 and 4, thereby facilitating the application of new fuses to the keeper whenever a new torch is mounted in the casing.

In order to facilitate the mounting of a new torch in the casing in the dark, illuminating means are provided which are inoperative while the enclosing casing for the torch is closed but become operative when the torch is lighted and the enclosing casing is open in the manner heretofore described. It is preferable for this purpose to employ an electric incandescent service lamp 58 which is mounted on the upper part of the casing base plate 25 and has one end of its filament grounded on this plate while the opposite end thereof is connected by a line 59 with the keeper 45, as shown in Figs. 2, 3, 6 and 12. By this means a by-pass or branch circuit is formed which includes the service lamp 58, this by-pass circuit, however, being of greater resistance than the fuse 42 so that when the latter is intact and in circuit with the terminal collar 44 and the ejecting spring, all of the electric current will pass through this fuse and leave the service lamp 58 unlighted, but the instant that this fuse is ruptured and the circuit therethrough is broken then the electric current will pass through the lamp 58 and illuminate the same automatically. The removal of a burned torch and its replacement by a new torch can thus be made conveniently and expeditiously in the dark without the aid of separate lamps for this purpose.

The electric circuit for igniting the cap or primer of the torch in order to give a flare signal may be controlled at a distance from the place where the torch is mounted and in the case of a truck or similar vehicle these controlling means are preferably arranged within the cab of the car adjacent to the driver's seat where they are readily available in order to permit a driver to quickly ignite the torch and give a flare signal in the event that the truck stops during nighttime. The circuits containing the fuse 42 and the heating element 33 are grounded on one side and the opposite side of the same includes a hand operated switch, the contacts 60 and 61 of which are mounted on the front part of the car, for example on the wind shield frame 62 or other available support in the cab. This switch 60, 61 also controls a branch or shunt circuit which is parallel with the main circuit and contains a pilot or test lamp 63 which offers a high resistance so that when the switch 60, 61 is open only a small amount of current will pass through the lamp 63 but sufficient to light it and thus inform the driver that the circuit including the fuse 42 and heating element 33 are complete and in operative condition. The current at this time, however, is insufficient in strength to sufficiently heat the fuse 42 for igniting the primer 24 or appreciably heating the thawing element 33. When the switch 60, 61 is closed the lamp 63 is shunted out and the full strength of the electric current is carried through the main circuit and operates to heat the thawing element 33 for releasing the lid if the same is frozen tight and also heating the fuse 42 sufficiently to render the same incandescent so the same will light the primer and also ruptured by being melted wholly or partially while subjected to the tension of the ejecting means 51, 52, 53.

The electric current for heating or melting the fuse 42, heating the thawing element 33, lighting the service lamp 58, and lighting the pilot lamp 63, may be derived from any suitable source but in actual practice the same is preferably derived from a standard wet battery 64 which forms part of the regular ignition system of the car. As shown in the wiring diagram, Fig. 12, this regular or standard wet battery has one of its poles or terminals grounded while its opposite pole or terminal may either be permanently connected with the main circuit through which current is supplied to the torch lighting and associated devices or the same may be connected with and disconnected from this main circuit by means of a battery changing switch which is so designed that the main battery may be cut out if the same has become exhausted and this main circuit may instead be connected with an auxiliary source for supplying current for effecting therein the heretofore described igniting, heating and lighting operations. This auxiliary current supply preferably consists of a dry emergency battery 65, one pole of which is grounded while the opposite pole may be connected with and disconnected from the main electric circuit of this ignition, heating and lighting system. A switch for accomplishing this purpose preferably consists of a movable contact 66 connected with one side of the main electric circuit and adapted to engage with a contact 67 connected with the ungrounded pole of the standard battery 64 or with a contact 68 connected with the ungrounded pole of the emergency battery 65, as illustrated in the diagram, Fig. 12.

This diagram also illustrates the manner in which two independent flare igniting, thawing, service lighting, and pilot lighting systems arranged on different parts of a truck or other vehicle may be operated either in unison or independently of each other by utilizing an electric current which may be derived either from a standard wet battery, or from a dry emergency auxiliary battery. If the car is stopped lengthwise on the road it is only necessary to operate one of these systems, and if the truck stands crosswise on the road due to skidding it is necessary to give signals on both sides of the car in order to avoid accidents.

Figs. 13, 14, 15 and 16 illustrate an embodiment of this invention which is more particularly intended for use on the rear part of a passenger automobile, this form of the same being constructed as follows:

The numeral 70 represents a metallic enclosing casing of tubular form which is mounted by means of a metal bracket 71 on some part of the automobile, such for example as the rear bumper 72 thereof so that this casing can be utilized as a ground for the electric current which operates the flare signal. The rear end 73 of this tubular casing is closed while the opposite end thereof may be closed normally by means of a cap 74 which is slipped thereon but prevented from becoming wholly detached from the casing by means of a flexible connector such as the chain 75, shown in Fig. 14. This casing is mounted horizontally on the car and provided within its rear part with an ejecting spring 76 and on one side of its interior with an electric conducting strip 77 which is insulated from the casing and connected at its rear end with a wire 78 which forms part of the main electric circuit corresponding to the circuit shown in Fig. 12.

In Fig. 14, the tubular body 79 of the torch is slipped lengthwise into the casing 70 and when in its innermost position the same compresses the spring 76. This torch is held in its innermost or retracted position by means which also serve to ignite this torch and which comprise a fuse 80 having the form of a wire filament which is adapted to melt or become weakened when traversed by an electric current, this wire having its central part engaging with a primer or cap 81 on the front end of the torch. One end of this fuse is connected by twisting or otherwise with an eye 82 arranged on a terminal collar 83 surrounding the front end of the torch body. This collar is also provided with a contact finger 84 which engages with the adjacent part of the metal casing and therefore grounds the respective end of the fuse 80. The opposite end of the fuse is engaged with an inclined slot 85 formed in the adjacent front end of the conducting strip 77 and bent laterally over the outer side of this strip, as shown at 86, for the purpose of connecting this end of this fuse with the conducting strip and placing the same in circuit with the main part of the electric conductor upon enclosing the circuit by means of a switch similar to that shown at 60, 61 in Fig. 12. When closing this circuit a current of electricity passes through the fuse 80 whereby the latter becomes heated and weakened and ultimately ruptured by the complete or partial melting of the fuse and also the pressure of the ejecting spring 76. When the fuse becomes thus heated and reaches the required degree of incandescence the primer or cap 81 becomes ignited and the latter in turn ignites the combustible illuminant in the body of the torch so that when the fuse is ruptured by heat and pressure the torch will be projected at its front end beyond the front end of the casing due to the resilience of the spring 76, whereby the cap 74 of this casing will be disengaged therefrom and the combustible illuminant of the torch will burn on the exterior of the casing in the form of a flame and give a signal to persons and vehicles in the same vicinity, thereby avoiding accidents which otherwise might possibly occur.

A signal flare of the character shown in Figs. 13–16 may be mounted either individually or of any suitable number on various parts of the car and the operation of the same may be effected in association with other necessary parts similar to those described with reference to the construction shown in Figs. 1 to 12.

From the foregoing it will be apparent that this signal flare permits of promptly giving an effective warning whenever a truck or other vehicle becomes stalled or stopped on a highway and thus aids in preventing loss of life and property. This signal flare is capable of being readily mounted on trucks and other vehicles with facility and the same can also be readily refilled whenever necessary so that the protection afforded by the use of this flare is always available for insuring greater safety in traffic on highways.

Moreover this signal flare is comparatively simple in construction and capable of being produced as well as installed at low cost, thereby permitting of its general adoption by operators of trucks and the like and thus reduce the cost of transportation due to the fact that more favorable insurance can be obtained by trucks and vehicles which are thus equipped.

We claim as our invention:

1. A signal flare for mounting on a vehicle an illuminating torch having a body containing a combustible illuminant and a spike at the lower end of said body, said flare comprising an enclosing casing having a relatively stationary base and a lid movable toward and from said base, and a supporting arm movably mounted on said base and adapted to carry the illuminating torch so that in one position of the arm the torch is within the casing and in another position the torch projects from the casing, said arm being pivoted on said base and provided with a socket for receiving the body of said torch, and the bottom of said socket being provided with an opening which receives the spike on the lower end of said body.

2. A signal flare comprising a support, a supporting arm pivoted on said support and adapted to carry a torch having an illuminant so that in one position the torch is retracted to the support and in another position the torch is projected therefrom, means for holding the torch in its retracted position including a rupturable fuse adapted to ignite the illuminant of said torch by the passage of an electric current through said fuse, a terminal collar mounted on said torch and having one end of said fuse attached thereto, and a keeper arranged on said support and having the other end of said fuse connected therewith.

3. A signal flare comprising a support, a supporting arm pivoted on said support and adapted to carry a torch having an illuminant so that in one position the torch is retracted to the support and in another position the torch is projected therefrom, means for holding the torch in its retracted position including a rupturable fuse adapted to ignite the illuminant of said torch by the passage of an electric current through said fuse, a terminal collar detachably mounted on said torch and having one end of said fuse attached thereto, and a keeper arranged on said support and having the other end of said fuse connected therewith and movable into and out of its operative position.

4. A signal flare comprising an enclosing casing having a relatively stationary base and a lid movable toward and from said base, which base and lid are adapted to be exposed to cold weather and liable to be stuck together by the sleet or frozen rain, a supporting arm movably mounted on said base and adapted to carry an illuminating torch so that in one position of the arm the torch is within the casing and in another position the torch projects from the casing, and means for heating the cooperating parts of said base and lid to melt said sleet and release the lid from said base.

5. A signal flare comprising a metal casing having a tubular body, a torch movably arranged in said body and containing a combustible illuminant, a spring arranged between the rear part of said body and the rear end of the torch and adapted to project the latter from the casing, and means for retaining the torch in said body and igniting the combustible illuminant of the torch including a fuse adapted to light said illuminant, an electric terminal collar arranged on said torch and engaging with said body and connected with one end of said fuse, and an electric terminal strip mounted on said body and having a slit which receives the opposite end of said fuse.

6. A signal flare for utilizing a torch having a body of combustible illuminant and a primer for igniting said illuminant; comprising a support, a carrier mounted on said support and movable laterally thereto into a retracted inoperative position and into a projected operative position and adapted to carry said torch, means for projecting said carrier and torch and a fuse which is arranged along said primer and operatively connected at one end with said carrier and at its opposite end with said support and which in its unruptured state holds said carrier and the torch thereon in a retracted position and which is adapted to be heated by an electric current to ignite said primer and to be ruptured by said current for releasing said carrier and the torch thereon and permit them to move into an operative position after the torch is ignited.

7. A signal flare for utilizing a torch having a body of combustible illuminant and a primer for igniting said illuminant; comprising a support on which said torch is movably mounted, a terminal collar adapted to be removably mounted on said torch, and a rupturable fuse which is adapted to be heated by the passage of an electric current therethrough and to ignite the primer and illuminant of said torch and which is arranged along said primer and has one of its ends connected with said terminal collar and its opposite end connected with said support.

8. A signal flare for utilizing a torch having a body of combustible illuminant and a primer for igniting said illuminant; comprising a support on which said torch is movably mounted, a terminal collar adapted to be removably mounted on said torch, a rupturable fuse which is adapted to be heated by the passage of an electric current therethrough and to ignite the primer and illuminant of said torch and which is arranged along said primer and has one of its ends connected with said terminal collar and its opposite end connected with said support, a carrier movably mounted on said base and adapted to be retracted relative thereto with said torch or projected therefrom, and a spring which is interposed between said base and collar and adapted to project the carrier and torch from said base and also serve as part of the means for conducting an electric current to said fuse.

ALBERT F. GODFREY.
REGINALD WEDGWOOD.